(12) United States Patent
Wawers

(10) Patent No.: US 8,967,703 B2
(45) Date of Patent: Mar. 3, 2015

(54) REINFORCEMENT FOR A VEHICLE PILLAR

(71) Applicant: GM Global Technology Operations LLC, Detroit, MI (US)

(72) Inventor: Uwe Wawers, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/708,762

(22) Filed: Dec. 7, 2012

(65) Prior Publication Data
US 2013/0187410 A1    Jul. 25, 2013

(30) Foreign Application Priority Data

Dec. 8, 2011    (DE) .................. 10 2011 120 519

(51) Int. Cl.
*B60J 7/00* (2006.01)
*B62D 25/04* (2006.01)
*B62D 21/15* (2006.01)

(52) U.S. Cl.
CPC .............. *B62D 25/04* (2013.01); *B62D 21/157* (2013.01)
USPC .................................................... 296/193.06

(58) Field of Classification Search
USPC ........................................ 296/193.06, 203.01
See application file for complete search history.

(56) References Cited

U.S. PATENT DOCUMENTS

| | | | |
|---|---|---|---|
| 6,102,472 A | 8/2000 | Wallstroem | |
| 6,524,404 B2 | 2/2003 | Gehringhoff et al. | |
| 7,445,269 B2 * | 11/2008 | Yustick et al. | ........... 296/187.01 |
| 7,506,911 B2 * | 3/2009 | Lee | .............................. 296/96.21 |
| 7,621,556 B2 * | 11/2009 | Itakura | ........................ 280/728.2 |
| 7,762,622 B2 * | 7/2010 | Lakic | ......................... 296/193.06 |
| 7,900,997 B2 * | 3/2011 | Hosaka et al. | ........... 296/193.12 |
| 7,976,098 B2 * | 7/2011 | Nishimura et al. | ....... 296/193.06 |
| 8,011,690 B2 * | 9/2011 | Zucal et al. | ................. 280/728.3 |

(Continued)

FOREIGN PATENT DOCUMENTS

DE    20014361 U1    10/2000
DE    10002617 A1    7/2001

(Continued)

OTHER PUBLICATIONS

German Patent Office, Search Report for German Application No. 102011120519.9, dated Aug. 1, 2012.

(Continued)

*Primary Examiner* — Kiran B Patel
(74) *Attorney, Agent, or Firm* — Ingrassia Fisher & Lorenz, P.C.

(57) ABSTRACT

A reinforcement for a vehicle pillar, for example, the B pillar of a vehicle is provided. The reinforcement includes a reinforcing structure and a stiffening structure. The reinforcing structure is configured with an upper end region for connection to the vehicle roof and with a lower end region for connection to the underfloor and/or a sill structure of the vehicle. The stiffening structure is connected to the reinforcing structure in order to stiffen the reinforcing structure against a side impact of the vehicle. The reinforcing structure has at least one material section which projects with respect to the stiffening structure, which serves to connect the reinforcing structure to the outer skin and/or the inner skin of the vehicle pillar. The reinforcing structure comprises a weldable non-boron steel and the stiffening structure comprises a hardened boron steel. A vehicle pillar having such a reinforcement is also provided.

7 Claims, 3 Drawing Sheets

(56) References Cited

U.S. PATENT DOCUMENTS

| | | | | |
|---|---|---|---|---|
| 8,029,047 B2* | 10/2011 | Kim et al. | | 296/193.06 |
| 8,128,157 B2* | 3/2012 | Heo et al. | | 296/193.06 |
| 8,205,925 B2* | 6/2012 | Hattori | | 296/30 |
| 8,246,108 B2* | 8/2012 | Itakura | | 296/193.06 |
| 8,371,643 B2* | 2/2013 | Itakura | | 296/203.03 |
| 8,393,672 B2* | 3/2013 | Mori | | 296/193.06 |
| 8,444,211 B2* | 5/2013 | Fujita | | 296/187.05 |
| 8,480,163 B2* | 7/2013 | Mori | | 296/193.06 |
| 8,491,046 B2* | 7/2013 | Nagai et al. | | 296/193.05 |
| 8,567,857 B2* | 10/2013 | Fujii et al. | | 296/204 |
| 2004/0056514 A1* | 3/2004 | Miyazaki | | 296/193.06 |
| 2005/0189790 A1 | 9/2005 | Chernoff et al. | | |
| 2006/0186705 A1* | 8/2006 | Rashidy et al. | | 296/193.06 |
| 2008/0143147 A1* | 6/2008 | Lee | | 296/193.06 |
| 2008/0211264 A1 | 9/2008 | Riess et al. | | |
| 2010/0060037 A1* | 3/2010 | Terai et al. | | 296/193.06 |
| 2010/0231004 A1* | 9/2010 | Lakic | | 296/193.06 |
| 2010/0308623 A1* | 12/2010 | Bodin et al. | | 296/193.06 |
| 2011/0095567 A1* | 4/2011 | Ishigame et al. | | 296/187.03 |
| 2011/0156446 A1* | 6/2011 | Iwase et al. | | 296/193.06 |
| 2011/0163571 A1* | 7/2011 | Furusako et al. | | 296/193.06 |
| 2011/0227370 A1* | 9/2011 | Yasuda | | 296/193.06 |
| 2011/0309657 A1* | 12/2011 | Hutter et al. | | 296/193.06 |
| 2012/0049575 A1* | 3/2012 | Marquette | | 296/193.06 |
| 2012/0098297 A1* | 4/2012 | Kurokawa | | 296/193.06 |
| 2012/0119477 A1* | 5/2012 | Kim | | 280/801.2 |
| 2012/0256445 A1* | 10/2012 | Baccouche et al. | | 296/193.06 |
| 2012/0267882 A1* | 10/2012 | Hamlett et al. | | 280/735 |
| 2012/0274099 A1* | 11/2012 | Tamura | | 296/193.06 |
| 2012/0299334 A1* | 11/2012 | Takayama et al. | | 296/193.06 |
| 2013/0020833 A1* | 1/2013 | Yao | | 296/193.06 |
| 2013/0033072 A1* | 2/2013 | Tanaka et al. | | 296/193.06 |
| 2013/0113237 A1* | 5/2013 | Huhn | | 296/193.05 |
| 2013/0140851 A1* | 6/2013 | Zornack et al. | | 296/193.06 |
| 2013/0187409 A1* | 7/2013 | Moll | | 296/193.06 |
| 2013/0193716 A1* | 8/2013 | Kurokawa | | 296/193.06 |
| 2013/0234469 A1* | 9/2013 | Fujita | | 296/193.06 |
| 2013/0234470 A1* | 9/2013 | Fujita | | 296/193.06 |
| 2013/0234471 A1* | 9/2013 | Fujita | | 296/193.06 |
| 2013/0241238 A1* | 9/2013 | Fujita | | 296/193.06 |
| 2013/0257101 A1* | 10/2013 | Shono | | 296/191 |
| 2013/0278017 A1* | 10/2013 | Arikai et al. | | 296/193.06 |
| 2013/0285414 A1* | 10/2013 | Alavandi et al. | | 296/193.06 |
| 2013/0300155 A1* | 11/2013 | Kurokawa | | 296/193.06 |

FOREIGN PATENT DOCUMENTS

| | | |
|---|---|---|
| DE | 69706145 T2 | 3/2002 |
| DE | 102004032599 A1 | 2/2006 |
| DE | 102005017981 A1 | 11/2006 |
| DE | 102005017982 A1 | 11/2006 |
| DE | 102005038488 A1 | 2/2007 |
| DE | 102009047956 A1 | 4/2011 |
| JP | 2000085620 A | 3/2000 |
| JP | 200118051 A | 8/2002 |
| JP | 2009262614 A | 11/2009 |
| JP | 2009274590 A | 11/2009 |
| JP | 2010254187 A | 11/2010 |
| JP | 2011088484 A | 5/2011 |
| WO | 2011071433 A1 | 6/2011 |
| WO | 2011071434 A1 | 6/2011 |
| WO | 2011151962 A1 | 12/2011 |

OTHER PUBLICATIONS

Search Report dated Mar. 7, 2013 for GB1220570.4.

* cited by examiner

REINFORCEMENT FOR A VEHICLE PILLAR

CROSS-REFERENCE TO RELATED APPLICATION

This application claims priority to German Patent Application No. 10 2011 120 519.9, filed Dec. 8, 2011, which is incorporated herein by reference in its entirety.

TECHNICAL FIELD

The present disclosure relates to a reinforcement for a vehicle pillar, in particular the B pillar of a vehicle comprising a reinforcing structure and a stiffening structure which stiffens the reinforcing structure. The present disclosure further relates to a vehicle pillar, in particular the B pillar of a vehicle having such reinforcement.

BACKGROUND

Vehicle pillars are a central component of the vehicle body of a motor vehicle and have an important function with a view to protection of the occupants in the event of a side impact of the vehicle. The vehicle pillars usually have an outward-facing outer skin and an inner skin facing inward to the passenger compartment. Inner skin and outer skin are usually formed from thin-wall formed sheet metal and each have such a cross-sectional profile that in the assembled state, a profile having a closed cross-section is formed by outer skin and inner skin.

The vehicle pillars usually have a reinforcement which is disposed inside the closed cross-section of outer skin and inner skin. The reinforcement serves to give the respective vehicle pillar a sufficient stability in order to meet the high requirements for protection of passengers in the event of a side impact of the motor vehicle. Outer skin, inner skin and reinforcement are usually interconnected by means of spot welding and/or laser welding, where one welded joint respectively connects the outer skin and the inner skin with the reinforcement interposed.

The reinforcement usually comprises a reinforcing structure which extends upward as far as onto the vehicle roof and downward as far as the underfloor of the vehicle body and provides for the necessary stability of the vehicle pillar. In addition a stiffening structure is usually provided through which the reinforcing structure is stiffened over a longitudinal section in order to avoid caving-in of the vehicle pillar.

Thus, it may be desirable to provide a reinforcement for a vehicle pillar, in particular the B pillar, of a vehicle having the features specified initially, which can be welded particularly well to the outer skin and/or the inner skin for the vehicle pillar and at the same time has particularly good stiffening properties in order to withstand high impact forces in the event of a side impact of the vehicle. Furthermore, it may be desirable to provide a vehicle pillar, which is suitable for the use of such a reinforcement. In addition, other objects, desirable features and characteristics will become apparent from the subsequent summary and detailed description, and the appended claims, taken in conjunction with the accompanying drawings and this background.

SUMMARY

A reinforcement according to various exemplary embodiments of the present disclosure for a vehicle pillar, in one example, the B pillar, of a vehicle comprises a reinforcing structure and a stiffening structure, wherein the reinforcing structure is configured with an upper end region for connection to the vehicle roof and with a lower end region for connection to the underfloor and/or a sill structure of the vehicle. The stiffening structure is connected to the reinforcing structure in order to stiffen the reinforcing structure against a side impact of the vehicle.

According to the various teachings of the present disclosure, it is provided that the reinforcing structure has at least one material section which projects with respect to the stiffening structure, which serves to connect the reinforcing structure to the outer skin and/or the inner skin of the vehicle pillar. The region of the material section is therefore free from the stiffening structure so that the reinforcement according to the present disclosure can be connected or is connected to the outer skin or the inner skin via the material section without the assistance of the stiffening structure. The outer skin and/or the inner skin can each be a thin-walled formed sheet metal part which has a material section substantially corresponding to the material section, by means of which the outer skin or the inner skin with the material section of the reinforcement according to the present disclosure are connected to one another, for example by means of at least one welded connection, in one example, spot welded connection and/or laser welded connection.

According to the present disclosure, it is further provided that the reinforcing structure comprises a weldable non-boron steel and the stiffening structure comprises a hardened boron steel.

By using a hardened boron steel for the stiffening structure, a material having particularly high strength is used, through which the stiffening structure exerts a particularly good stiffening effect on the reinforcement. At the same time, it is avoided that the hardened boron steel assists with a possible welding of the reinforcement to the outer skin or inner skin of the vehicle pillar, whereby the said material section of the reinforcing structure is provided for connecting the reinforcement to the outer skin or inner skin and this material section is free from the stiffening structure. The reinforcement according to the present disclosure therefore uses the particularly positive property of hardened boron steel, namely its particularly high strength. At the same time, the boron steel is specifically not used for welding the reinforcement to the outer skin or inner skin in order to avoid an unfavorable change in the structure of the hardened boron steel during welding, which would adversely affect its load-bearing capacity.

A boron steel is understood in the course of the present disclosure as a boron-containing steel or a boron-containing steel alloy. The boron steel is also designated as boron steel. The boron steel can, for example, be 22MnB5.

The boron steel used in the reinforcement according to the present disclosure is hardened, in one example, through-hardened, whereby the boron steel acquires a very high strength and can therefore be ascribed to the high-strength steels.

The boron steel is generally quench-hardened, for example, by heating the boron steel to a predefined temperature, maintaining the heating over a predefined time interval and then rapidly cooling the boron steel while observing its critical cooling rate.

According to one exemplary embodiment of the present disclosure, it is possible that the reinforcing structure comprises a high-strength steel or a high-strength steel alloy. Such a high-strength steel alloy can, for example, be a DP steel which is also designated as dual-phase steel. Such a high-strength non-boron steel is substantially better suited for welding than the hardened boron steel and is therefore particularly suitable for forming the reinforcing structure with its material section serving as welding flange.

According to another exemplary embodiment of the present disclosure, it is provided that the stiffening structure abuts against the reinforcing structure at least partially and ends below the lower end region of the reinforcing structure. It is thereby ensured that in the event of a side impact of the motor vehicle, the reinforcement between the end regions withstands the high impact forces as a result of the stiffening structure. With the reinforcement according to the present disclosure, the forces usually acting on the lower region of the vehicle pillar in the event of a side impact of the motor vehicle bring about a desired caving in of the vehicle pillar in the lower end region which is already free from the stiffening structure. In this respect, this measure enables a specific introduction of forces in the event of a side impact.

It is possible that the stiffening structure which at least partially abuts against the reinforcing structure ends outside the upper end region of the reinforcing structure. As a result, material of the stiffening structure is saved and the vehicle pillar is therefore reduced in its weight. Since in the event of a side impact of the vehicle, the impact forces act substantially on the lower region of the vehicle pillar, such a shortened configuration of the stiffening structure compared with the reinforcing structure is appropriate in the upper region of the vehicle pillar.

According to another exemplary embodiment of the present disclosure, it is provided that the stiffening structure extends over a longitudinal section of the reinforcing structure and the stiffening structure is pulled on from outside. The application of the stiffening structure to the reinforcing structure is thereby possible in a simple manner.

It is thereby also possible that on the inner wall of the reinforcing structure, at least one attached weld nut which, for example, serves to receive one or more hinges of a vehicle door, can be welded-on particularly durably with the weldable non-boron steel. This is because a welding-on of the weld not against the hardened boron steel of the stiffening structure is thereby avoided.

It is possible that the reinforcing structure has a circumferential cross-section which is open on one longitudinal side at least over a longitudinal section, wherein the stiffening structure acts on the outer side of at least one wall of the reinforcing structure. The stiffening structure is as a result larger in area than the area of the stiffening structure would be for the same longitudinal section if the stiffening structure were to act on the inner side of the reinforcing structure.

Also aimed in this direction is the executed measure whereby reinforcing structure and stiffening structure have a substantially U-shaped cross-section at least over one longitudinal section, the stiffening structure is pulled onto the reinforcing structure from outside and the walls of reinforcing structure and reinforcing structure are at least partially adjacent to one another. The U-shaped cross-section of the reinforcing structure provided by this measure and in one example, the cross-section of the stiffening structure configured in a substantially corresponding manner can be achieved in a technically simple manner, for example by forming the material for the stiffening structure and the reinforcing structure.

It is further possible that when viewed in cross-section, the legs of the U-shaped reinforcing structure project with respect to the respectively corresponding legs of the stiffening structure with a section. Since the legs of the reinforcing structure are configured to be longer than the legs of the stiffening structure, free-standing material sections are formed in a technically simple manner from the stiffening structure, which for example serve to form the material section for connection of the outer skin or inner skin of the vehicle pillar.

In order to avoid protruding edges on the outer side of the reinforcement, according to another exemplary embodiment of the present disclosure it is provided that the outer side of the legs of the stiffening structure with the outer side of the respectively appurtenant section of the reinforcing structure run substantially flush to one another. As a result, a substantially flat outer side of the reinforcement is obtained and thereby provides an optimal large-area contact surface for the outer skin or the inner skin of the vehicle pillar.

According to another exemplary embodiment of the present disclosure, it is provided that at the ends of the legs of the U-shaped reinforcing structure, the respectively one material section is formed in each case, which serves to connect the reinforcing structure to the outer skin and/or the inner skin of the vehicle pillar. The material section serving as a flange for connecting the outer skin or the inner skin is thereby achieved in a simple manner. The material section can, for example be configured so that it stands laterally on the outside which is thereby particularly suitable for placement or connection with its two exterior surfaces to respectively one corresponding material section of the outer skin or inner skin.

In one example, the material section or weld flanges of the reinforcing structure extends in the longitudinal direction of the reinforcement.

It is possible that reinforcing structure and stiffening structure are each a sheet metal part.

It is further possible that the reinforcing structure is a cold formed part and the stiffening structure is a hot formed part which, after their forming, are structurally interconnected, in one example, are connected to one another by welding and/or adhesive bonding. The reinforcement can thereby be achieved in a technically relatively complex geometry, where reinforcing structure and stiffening structure are fixed particularly durably with respect to one another. Spot welding and/or laser welding can be performed as welding.

It is possible that the hardening of the boron steel, in one example, quench hardening, is produced whereby after the forming of the stiffening structure by means of hot forming, the stiffening structure is brought to a predefined temperature or the already existing temperature of the stiffening structure from the hot forming process is maintained and starting from this, the stiffening structure is then subjected to a quench cooling in the shaping matrix. As a result of the quenching process, the stiffening structure according to the present disclosure is then produced, which has a particularly high strength.

According to another exemplary embodiment of the present disclosure, it can be provided that the reinforcing structure and stiffening structure are formed by a joint hot forming and prior to the forming, the basic semifinished products, which can be a flat material, for example, were structurally connected to one another, in one example, connected to one another by welding and/or adhesive bonding. By means of such a patchwork, the geometry of the reinforcement can be produced in a generally low-stress manner although the reinforcement comprising two structures, namely the reinforcing structure and the stiffening structure, is made of different material. Reinforcing structure and stiffening structure thus form a common hot formed part. Spot welding and/or laser welding can be performed as welding.

In the course of producing this patchwork, it is possible that the hardening, in one example, quenching hardening of the boron steel, is produced whereby after the joint forming of reinforcing structure and stiffening structure by means of the hot forming, both structures are jointly brought to a pre-defined temperature or the already existing temperature for the hot forming process is maintained and starting from the reinforcing structure and stiffening structure are then subjected to a quench cooling in the forming matrix. As a result of the quenching process, the stiffening structure according to the present disclosure is produced, which has a particularly high strength. Since reinforcing structure and stiffening structure are formed by a joint hot forming, which are present jointly in the forming matrix, a quenching of both parts comes about, namely the part for the stiffening structure and the part for the reinforcing structure. The material for the reinforcing structure is selected in this respect so that despite the quenching the desired component properties are achieved.

According to another exemplary embodiment, the present disclosure relates to a vehicle pillar, in one example, the B pillar of a vehicle having a reinforcement of the type described previously.

It is possible that the vehicle pillar comprises an outer skin and an inner skin and the reinforcement is disposed in between. As a result, the reinforcement of outer skin and inner skin is present in clad form. The reinforcement is therefore not visible from outside.

It is further possible that the outer skin and the inner skin are connected to the reinforcement, whereby the reinforcing structure of the reinforcement with its material section which serves for connection of the reinforcing structure to the outer skin and/or the inner skin of the vehicle pillar, are welded to the outer skin and the inner skin by means of a joint welded connection with respect to one another. The at least one joint welded connection is generally a spot welded connection or laser welded connection. Since the material section of the reinforcement is used for welding, a welding toward the non-boron steel is achieved on the part of the reinforcement so that the inner skin and outer skin generally each comprising non-boron steel together with the material section can overall be welded particularly well to one another and therefore a permanent and particularly durable fixing of outer skin, inner skin and reinforcement toward one another is achieved.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
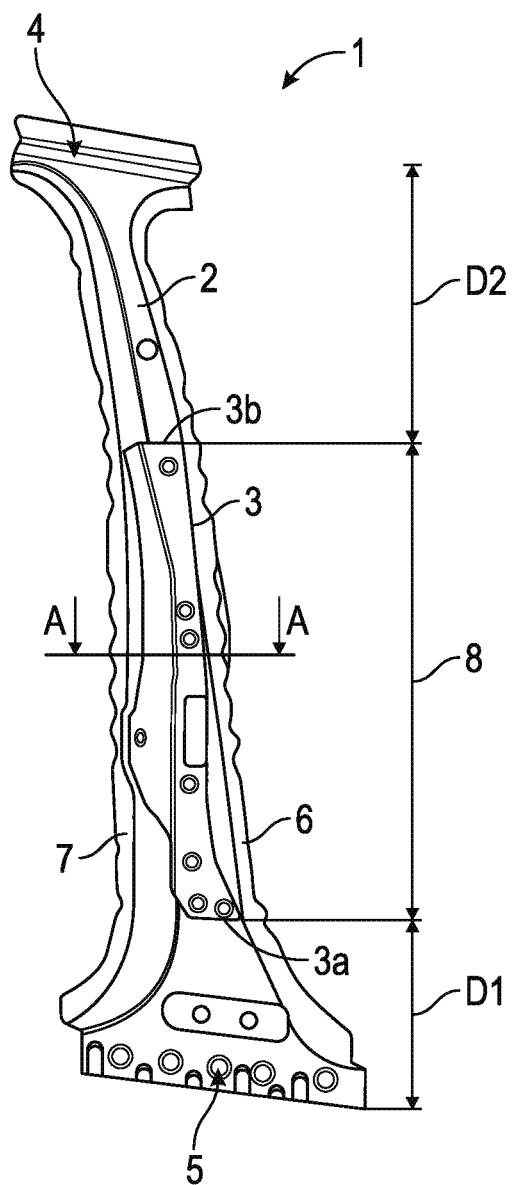
FIG. 1 shows an exemplary embodiment of a reinforcement for a vehicle pillar in a perspective view.

FIG. 1 shows, in schematic view, an exemplary embodiment of a reinforcement 1 for a vehicle pillar, which for example can be the B pillar of a vehicle. The reinforcement 1 is used for reinforcing and/or stiffening the vehicle pillar in order to give sufficient stability to the vehicle pillar in the event of a side impact of the vehicle, and only deform in a predefined manner and thereby ensure optimal protection for the passengers.

To this end, the reinforcement 1 has a reinforcing structure 2 and a stiffening structure 3, where the reinforcing structure 2 is configured with an upper end region 4 for connection to the vehicle roof and with a lower end region 5 for connection to the underfloor and/or a sill structure of the vehicle.

The stiffening structure 3 abuts against the reinforcing structure 2 at least partially and is connected to this in order to stiffen the reinforcing structure 2 against a side impact of the vehicle. The stiffening structure 3 is connected to the reinforcing structure 2 in one example, by means of adhesive bonding and/or welding, for example, spot welding or laser welding.

The stiffening structure 3 generally ends outside the lower region 5 of the reinforcing structure 2 such that an end 3a of the stiffening structure 3 is spaced a distance D1 from the lower end region 5 (FIG. 1). As a result, the lower end region 5 is substantially free from the stiffening effect of the stiffening structure 3 so that in the event of a side impact of the vehicle, a desired caving in of the vehicle pillar is produced in the lower end region 5.

The stiffening structure 3 extends along the reinforcing structure 2 in the direction of the upper end region 4. The stiffening structure 3 generally ends in the upper third of the longitudinal extension of the reinforcing structure 2 such that an end 3b of the stiffening structure 3 is spaced a distance D2 from the upper end region 4, which is different than the distance D1 the end 3a of the stiffening structure 3 is spaced from the lower end region 5 (FIG. 1), so that the stiffening structure 3 extends to a sufficient degree approximately to the height of the impact forces which usually occur on the vehicle pillar and thus the impact forces act on the stiffening structure 3. The stiffening structure 3 therefore extends along the reinforcing structure 2 over a longitudinal section of the reinforcing structure 2, which in FIG. 1 is provided with the reference number 8. As shown in FIG. 1, a first material section 6 and a second material section 7 extend along a longitudinal axis of the reinforcing structure 2 from the upper end region 4 to the lower end region 5, and each of the first material section 6 and the second material section 7 project outwardly or away from the stiffening structure 3.

It is provided that the stiffening structure 3 comprises a quench-hardened boron steel, such as for example 22MnB5. It is further provided that the reinforcing structure 2 comprises a high-strength non-boron steel, which for example, can be a dual phase steel.

Since the quench-hardened boron steel makes welding difficult, merely the reinforcing structure 2 is used for connection of further components of the (not shown in FIG. 1) components of a vehicle pillar to the reinforcement 1. The stiffening structure 3 on the other hand is configured in such a manner that its walls are not involved in the connection to further components of the vehicle pillar.

Figure 2:
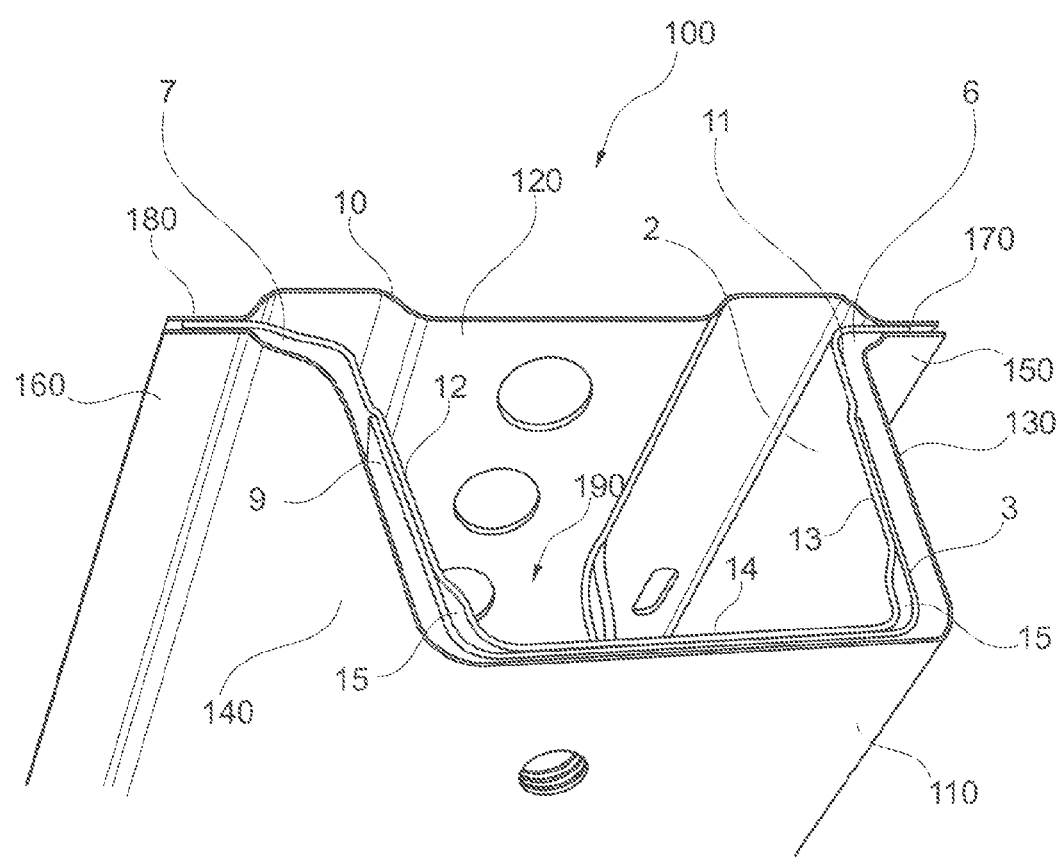
FIG. 2 shows the reinforcement according to FIG. 1, built into an exemplary embodiment of a vehicle pillar in sectional view of a longitudinal section of the vehicle pillar.

FIG. 2 shows the reinforcement 1 from FIG. 1, built into another exemplary embodiment of a vehicle pillar 100, where only a small longitudinal section of the vehicle pillar 100 is shown in FIG. 2 and the vehicle pillar 100 is shown in cross-section.

As can be seen from FIG. 2, the vehicle pillar 100 comprises an outer skin 110, which can generally be formed from a formed metal sheet. The outer skin 110 is generally configured to be substantially U-shaped in cross-section over a longitudinal section, where respectively one outwardly projecting material section 150 or 160 is provided at the ends of each of the legs 130 and 140 of the U-shaped outer skin 110, which extends in the longitudinal direction of the outer skin and in each case serves as a flange, in one example, a weld flange.

The vehicle pillar 100 further has an inner skin 120 which is generally formed from a formed sheet metal part, in one example, is formed from a high-strength cold-formed sheet metal part, and when viewed in cross-section, has respectively one material section 170 or 180 at its opposite end regions, which extends in the longitudinal direction of the vehicle pillar 100 and is also formed as a flange, in one example, a weld flange.

The outer skin 110 and the inner skin 120 are connected to one another at their flanges 160 and 180 as well as 150 and 170 to form a cavity 190, where the reinforcement 1 with its reinforcing structure 2 and stiffening structure 3 is disposed inside the cavity 190.

The reinforcement 1 is generally connected to the outer skin 110 and the inner skin 120 in such a manner that the material section 6 of the reinforcing structure 2 comprising non-boron steel lies as a flange between the flange 150 of the outer skin 110 and the flange 170 of the inner skin 120 on the other hand and the material section 7 of the reinforcing structure 2 comprising non-boron steel lies between the flange 160 of the outer skin 110 and the flange 180 of the inner skin 120. The respectively three material sections 160, 7, and 180 and 150, 6, and 170 lying on top of one another are each interconnected via at least one joint connection, in one example, a spot welded connection.

As can be seen from FIG. 2, the reinforcing structure 2 has a substantially U-shaped cross-section so that the reinforcing structure 2 has a contour substantially corresponding with the outer skin 110 and the stiffening structure 3 lies between the reinforcing structure 2 and the outer skin 110. To this end the stiffening structure 3 is also configured to have a substantially U-shaped cross-section and is pulled from outside onto the U-shaped cross-section contour of the reinforcing structure 2.

It can be seen that the reinforcing structure 2 in the region of the transition of its legs 12, 13 toward the base section 14 of the U shape is in each case inwardly shaped with respect to the contour of the stiffening structure 3 and thus, when viewed in cross-section, a cavity 15 is formed in each case between the reinforcing structure 2 and the stiffening structure 3.

Figure 3:
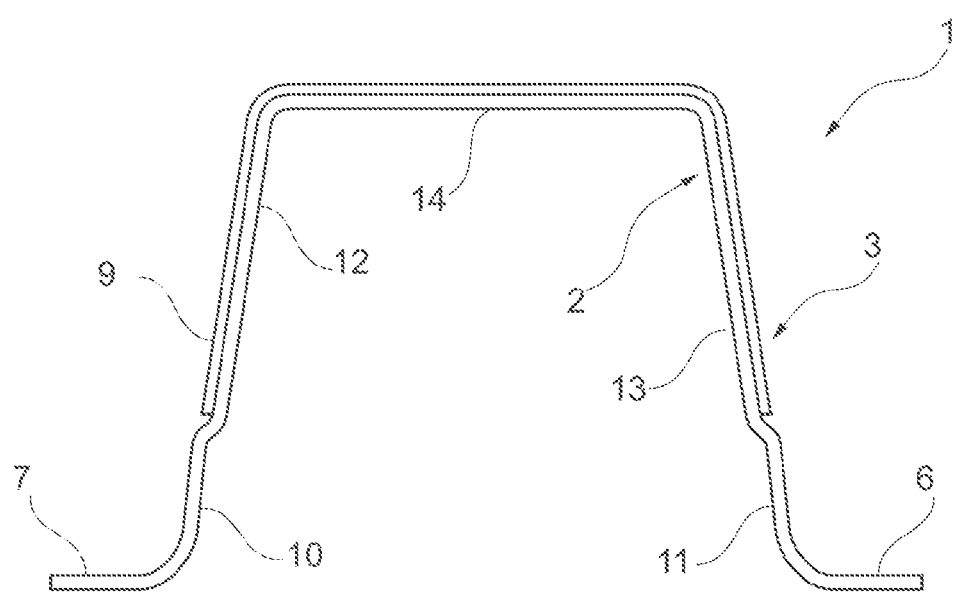
FIG. 3 shows another exemplary embodiment of a reinforcement for a vehicle pillar shown in a sectional view along the line of intersection A-A of FIG. 1.

FIG. 3 shows another exemplary embodiment of a reinforcing structure 1' for a vehicle pillar.

Components or sections of the reinforcement 1' according to FIG. 3, which are identical to the component or sections of the reinforcing structure 1 according to FIGS. 1 and 2 or have the same function, are provided with the same reference numbers; in this respect reference is made to the description for FIGS. 1 and 2.

The reinforcing structure 1' according to FIG. 3 differs from the reinforcement 1 of FIGS. 1 and 2 inter alia in that in the transition regions from the legs 12 and 13 to the base section 14 of the U-shaped reinforcing structure 2, a depression and therefore the cavity 15 apparent from FIG. 2 is not provided but even in the edge zone, the reinforcing structure 2 abuts substantially against the stiffening structure 3.

As can be seen from the cross-sectional view of the reinforcement 1 in FIG. 3, the legs 12, 13 of the U-shaped reinforcing structure 2 project with respectively one section 10 or 11 with respect to the stiffening structure 3 or are configured to be longer.

Furthermore, the reinforcing structure 2 is formed in such a manner that the legs 3 of the stiffening structure 3 and the sections 10 and 11 of the reinforcing structure 2 associated with the respective legs of the stiffening structure 3 form an outer side 9 of the reinforcement 1' which remains substantially the same as one another so that the section 10 or 11 with the respectively appurtenant leg of the stiffening structure 3 runs in alignment with one another. This is also achieved in the manner of the reinforcement 1 of FIGS. 1 and 2.

At the ends of the legs 10 and 11 of the U-shaped reinforcing structure 2, the material section 6 or 7 is molded on in each case, this being used to connect the reinforcing structure 2 to the outer skin 110 or the inner skin 120 of the vehicle pillar 100, as is apparent in particular from FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A reinforcement for a vehicle pillar, comprising:
   a reinforcing structure having an upper end region for connection to the vehicle roof and a lower end region for connection to at least one of an underfloor and a sill structure of a vehicle; and
   a stiffening structure connected to the reinforcing structure in order to stiffen the reinforcing structure against a side impact of the vehicle, the stiffening structure having a first end spaced a first distance from the upper end region of the reinforcing structure and a second end spaced a second distance from the lower end region of the reinforcing structure, with the first distance different than the second distance,
   wherein the reinforcing structure has a first material section opposite a second material section, each of the first material section and the second material section extending along a longitudinal axis of the reinforcing structure from the upper end region to the lower end region, and each of the first material section and the second material section projecting outwardly from the stiffening structure, and the first material section and the second material section serve to connect the reinforcing structure to the outer skin and the inner skin of the vehicle pillar, and the reinforcing structure includes a weldable steel and the stiffening structure includes a hardened boron steel.

2. The reinforcement according to claim 1, wherein the reinforcing structure comprises a high-strength steel or a high-strength steel alloy.

3. The reinforcement according to claim 1, wherein the stiffening structure abuts against the reinforcing structure at least partially.

4. The reinforcement according to claim 1, wherein the stiffening structure extends over a longitudinal section of the reinforcing structure and the stiffening structure is pulled on from outside.

5. The reinforcement according to claim 1, wherein the reinforcing structure has a circumferential cross-section which is open on one longitudinal side at least over a longitudinal section and the stiffening structure acts on the outer side of at least one wall of the reinforcing structure.

6. The reinforcement according to claim 1, wherein the reinforcing structure and stiffening structure have a substantially U-shaped cross-section at least over one longitudinal section, the stiffening structure is pulled onto the reinforcing structure from outside, and the walls of the reinforcing structure and the stiffening structure are at least partially adjacent to one another.

7. The reinforcement according to claim 1, wherein the reinforcing structure and the stiffening structure are structurally interconnected by at least one of welding and adhesive bonding.

* * * * *